United States Patent Office 3,042,637
Patented July 3, 1962

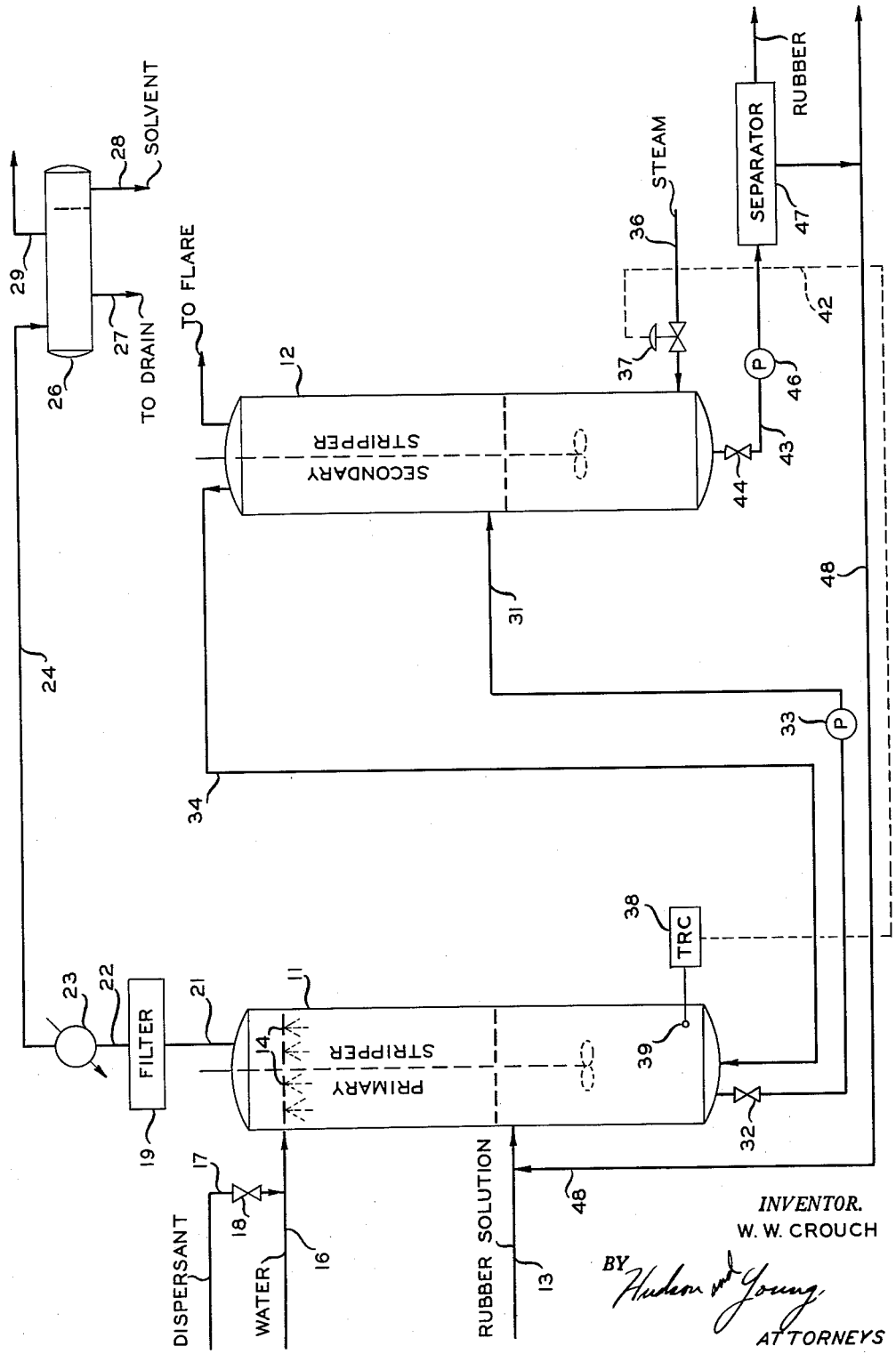

3,042,637
RECOVERY OF POLYMERS FROM SOLUTION
Willie W. Crouch, Bartlesville, Okla., assignor to Phillips Petroleum Company, a corporation of Delaware
Filed May 23, 1960, Ser. No. 30,817
5 Claims. (Cl. 260—17.5)

This invention relates to recovery of polymers from solution.

In recent years a great deal of work has been done in the development of new types of polymeric materials, primarily rubbery materials, wherein the polymer is produced in the presence of organometal initiators. The products of such polymerization processes are recovered from the polymerization zone as a solution in a hydrocarbon solvent. Of the various recovery processes suggested, steam stripping appears to have a commercial advantage. However, in some types of operation, difficulties have arisen because the product is not obtained as a crumb dispersed in the water. For subsequent operation, it is preferable to have the polymer as a crumb in a water slurry.

We have discovered a method by which rubber can be obtained in crumb form in a water slurry from a solution of the material in a hydrocarbon solvent.

The object of this invention is to obtain such a slurry.

Accompanying and forming a part of this disclosure is a drawing showing apparatus in which my invention can be used.

Broadly, the present invention resides in the discovery that a good crumb can be obtained from a solution of rubber in a hydrocarbon solvent by steam stripping by adding to the stripping zone an alkali metal lignin sulfonate.

The process of the invention can best be understood from the drawing which shows a primary stripper 11 and a secondary stripper 12. Rubber solution supply conduit 13 extends to an intermediate portion of primary stripper 11. In the upper portion of this stripper 11 there are provided spray nozzles 14, these being connected to a water supply conduit 16. Communicating with conduit 16 is a dispersant supply conduit 17 having valve 18 therein. Filter 19 is provided, this filter being connected to the upper end portion of stripper 11 by conduit 21. Conduit 22 extends from filter 19 to condenser 23 and conduit 24 extends from condenser 23 to phase separator 26. Phase separator 26 is provided with a water removal conduit 27, a solvent removal conduit 28 and a conduit 29 extending to a flare (not shown). Conduit 31 extends from the lower end portion of stripper 11 to an intermediate portion of stripper 12, this conduit having valve 32 and pump 33 therein. Conduit 34 extends from the upper end portion of stripper 12 to the lower end portion of stripper 11. Steam supply conduit 36 extends into the lower end portion of stripper 12, this conduit being provided with motor valve 37 therein. A temperature recorder controller 38 is connected to temperature sensing means 39 in the lower portion of stripper 11 and the output from controller 38 is operatively connected to motor valve 37 by conduit 42. Conduit 43, having valve 44 and pump 46 therein, extends from the lower end portion of stripper 12 to a separator 47. Conduit 48 provides water recycle from the separator to stripper 11.

The lithium, sodium, potassium, rubidium, and cessium lignin sulfonates can be used. The sodium and potassium lignin sulfonates are preferred. Sodium lignin sulfonate is presently commercially available, a process for its production being given in Industrial and Engineering Chemistry 50, No. 4, 570–576 (1958). Also described in this article are the partially desulfonated lignin sulfonates which can also be used in the process of my invention. The alkali metal lignin sulfonate is employed in the aqueous phase in an amount sufficient to give good crumb formation. Usual amounts range from 0.01 to 1 pound per 100 pounds of rubber charged to the process. The lignin sulfonate prevents agglomeration of polymer particles and sticking of such particles to the stirrer and walls of the vessel during the process of steam stripping to remove the solvent and precipitate the polymer.

In this system, it is possible to recover rubber crumb from various types of rubber in solution. These rubbery polymers are prepared by polymerizing a monomer system containing a single monomer or a mixture containing at least a major portion of conjugated dienes containing 4 to 8 carbon atoms. Examples of conjugated dienes which can be used include 1,3-butadiene, isoprene, 2,3-dimethylbutadiene, 2-methoxybutadiene, 1,3-hexadiene, and 1,3-octadiene. These conjugated dienes can be polymerized either alone or in admixture with each other and/or with one or more other compounds containing an active $CH_2$=C< group which are copolymerizable therewith. Suitable comonomers containing this group include styrene, acrylonitrile, methyl acrylate, methyl methacrylate, vinyl chloride, methyl vinyl ether, ethylene, propylene, 1-butene, 1-propene, 1-octene and the like. An important group of polymers are those with substantially all one type of structure such as cis-polybutadiene, trans-polybutadiene, cis-polyisoprene and transpolyisoprene. However, polymers containing substantial amounts of two or more types of configuration, such as polybutadiene formed by approximately equal amounts of cis and trans 1,4-addition, can be treated according to this invention.

The polymers are prepared in the presence of organic solvents including paraffins, cycloparaffins and aromatic hydrocarbons which are relatively inert, non-deleterious to the catalyst and liquid under the conditions of the process. Examples include the paraffin hydrocarbons such as propane, butane, pentane, isooctane; cycloparaffins, such as cyclohexane, methylcyclohexane; and aromatic compounds, such as benzene, toluene, and the like. The solvent is one which is normally liquid, which will dissolve the polymer, and which can be vaporized in the presence of steam or hot water.

A large number of initiator systems are suitable for the production of the polymers.

One type of initiator system is a two or more component catalyst wherein one component is an organometal compound, including those where one or more organo groups is replaced by a halogen; a metal hydride; or a metal of group I, II or III; and the second component is a group IV to VI compound, e.g., salt or alcoholate. This type of initiator system is fully described with a group of examples in columns 5 through 8 of Patent 2,886,561 dated May 12, 1959.

Another initiator system which is suitable involves the use of a compound of the formula $R(Li)_x$, wherein R is a hydrocarbon radical selected from the group consisting of aliphatic, cycloaliphatic and aromatic radicals and combinations of these radicals and $x$ is an integer from 1 to 4, inclusive. The aliphatic and cycloaliphatic radicals can be saturated or contain olefinic unsaturation. The R in the formula has a valence equal to the integer, and preferably contains from 1 to 20, inclusive, carbon atoms, although it is within the scope of the invention to use higher molecular weight compounds. Examples of these compounds include methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 9,10-dilithio-9,10-dihydroanthracene, 1,2-dilithio-1,8-diphenyloctane, 1,3,5 - trilithiopentane, 1,5,15 - trilithioeicosane, 1,3,5 - trilithiocyclohexane, 1,2,5 - trilithionaphthalene, 1,3,5-trilithioanthracene, 1,3,5,8-tetralithiodecane, 1,5,10, 20 - tetralithioeicosane, 1,2,4,6 - tetralithiocyclohexane, 1,2,3,5-tetralithio-4-hexylanthracene, 1,3 - dilithio-4-cyclohexene, and the like.

The amount of organolithium initiator employed can vary over a broad range. In general, the amount of initiator used will be in the range from 0.3 to 100 milliequivalents of lithium per 100 parts by weight of total monomers charged and will preferably be in the range from 0.6 to 15 milliequivalents of lithium per 100 parts by weight of total monomers charged. When n-butyllithium is employed as the initiator for the production of an easily processable 40 to 60 Mooney rubber (ML-4 at 212° F.), the quantity of initiator required will generally be in the range from 2 to 2.4 millimoles per 100 parts of total monomers charged.

Still another initiator system utilizes a cobalt compound and an alkyl metal or alkyl metal halide wherein one but not all of the alkyl groups can be replaced by halogen. The group III metals, as exemplified by aluminum, are used to provide the metal alkyl component. Examples of these organometal compounds include trialkylaluminums, such as triethylaluminum and triisobutylaluminum and alkyl aluminum halides, such as ethylaluminum dichloride and diethylaluminum chloride. For the cobalt compound, the cobaltous form is preferred. Examples of these compounds include cobaltus chloride, cobaltous sulfate, cobaltus nitrate, and the salts of organic acids, such as cobaltous acetate.

Some of the systems included within the above description have been found particularly suitable for the production of polymers having particular molecular configuration. For instance, polybutadiene having 85 to 100 percent of the polymer formed by cis 1,4-addition can be prepared using initiator systems comprising triisobutylaluminum and titanium tetraiodide; triisobutylaluminum, titanium terachloride, and iodine; and triisobutylaluminum, titanium tetraiodide, and titanium tetrachloride. Polybutadiene having 70 to 100 percent of the polymer formed by trans-1,4-addition can be prepared using an initiator system comprising lithium aluminum hydride and titanium tetraiodide. The catalyst system comprising lithium aluminum hydride and titanium tetrachloride produces a polybutadiene having a major amount of the polymer formed by 1,2-addition. Similar products are obtained using isoprene except that a portion of the product can be formed by 3,4-addition.

To determine the amount of the addition of the various types, the polymers can be dissolved in carbon disulfide to form a solution having 20 grams of polymer per liter of solution. The infrared spectrum of such a solution (percent transmission) is then determined in a commercial infrared spectrometer.

The percent of the total unsaturation present as trans 1,4- is calculated according to the following equation and consistent units: $\epsilon = E/tc$ where:

$\epsilon$ = extinction coefficient (liters - mols$^{-1}$ - microns$^{-1}$);
$E$ = extinction (log $Io/I$); $t$ = path length (microns); and
$c$ = concentration (mols double bond/liter). The extinction is determined at the 10.35 micron band and the extinction coefficient used is $1.21 \times 10^{-2}$ (liters-mols$^{-1}$-microns$^{-1}$).

The percent of the total unsaturation present as 1,2- (or vinyl) is calculated according to the above equation, using the 11.0 micron band and an extinction coefficient of $1.52 \times 10^{-2}$ (liters-mols$^{-1}$-microns$^{-1}$).

The percent of the total unsaturation present as cis 1,4- is obtained by subtracting the trans 1,4- and 1,2- (vinyl) determined according to the above methods from the theoretical unsaturation assuming one double bond per each $C_4$ unit in the polymer.

For treatment, it is preferred that the concentration of the polymer in the solvent be in the range of 5 to 15 percent rubber by weight. However, the broader range of 1 to 25 percent rubber is applicable, the higher concentration resulting in greater difficulty in mixing the rubber solution with the water. If effective mixing systems are available, it is quite possible to work with solutions containing more than 15 percent rubber.

The following examples illustrate the advantage obtained by using my invention:

*Example I*

A solution of cis-polybutadiene in toluene solvent was prepared by polymerizing 1,3-butadiene in toluene at 41° F. using a triisobutylaluminumtitanium tetraiodide initiator system. The polymer was formed 95 percent by cis 1,4 addition. The resulting solution contained 59 grams of cis-polybutadiene per liter of solution. The catalyst was deactivated by the addition of water, and the solution was washed twice to remove water-soluble catalyst residues. It was then stabilized by the addition of one part by weight per 100 parts rubber of the phenolic antioxidant, AO 2246 [2,2'-methylene-bis(4-methyl-6-tert-butylphenol)].

Water (1500 ml.) was introduced into a stainless steel vessel and 0.082 gram of sodium lignin sulfonate (Marasperse CB) was added. The solution was boiled and stirred vigorously while two liters of the solution of cis-polybutadiene in toluene, prepared as described above, was added at the rate of 12 to 20 milliliters per minute. As the rubber solution was introduced, vigorous boiling occurred and rubber crumbs formed. Concurrently with the addition of rubber solution, additional sodium lignin sulfonate was introduced until a total of 0.41 gram had been added. This amount corresponded to 0.35 part per 100 parts rubber of dispersant. A coarse filterable rubber crumb was obtained. The vessel and stirrer remained clean, i.e., no rubber crumb adhered to these surfaces. The rubber crumb was filtered, washed, and dried. The compounded and vulcanized stock had excellent properties.

When the foregoing run was repeated without the use of sodium lignin sulfonate, most of the rubber agglomerated into a single ball of polymer. A portion of the rubber stuck to the wall of the vessel and the stirrer.

*Example II*

The cis-polybutadiene rubber of Example I is recovered continuously in the process illustrated in the drawing. The stripping vessels 11 and 12 are 100-gallon tanks provided with stirrers. They are maintained approximately ½ full of water slurry during the stripping process by liquid level controllers. Rubber solution, containing 59 grams cis-polybutadiene per liter of solution, is fed to vessel 11 through inlet 13 at a rate of 50 gallons per hour. A vapor stream comprising approximately 46 gallons per hour of toluene and 80 gallons per hour of water is taken overhead through line 21 and condensed in condenser 23. The water is separated in separator 26. Solvent is recovered through line 28. Sodium lignin sulfonate (Marasperse CB) is charged to the stripper continuously via line 17 as a 5 weight percent aqueous solution at a rate of 0.48 pound of the solution per hour. A slurry of rubber containing a small amount of solvent is passed by line 31 to vessel 12 to which steam is supplied by conduit 36. The overhead product, water and solvent, is passed from vessel 12 to vessel 11 by line 34. Rubber pellets approximately ⅛ inch in diameter are removed in a slurry stream via line 43 at the rate of approximately 100 gallons per hour going to separator 47. The crumb is filtered and the serum is returned to the stripper through line 48. The rubber crumb substantially free of solvent is then washed and dried.

Example III

A solution of cis-polybutadiene of the type used in Example I was divided into two portions and steam stripped. In stripping Sample 1, a charge of sodium lignin sulfonate equal to one weight percent of the polymer was employed to prevent agglomeration. No surface active agent was added to Sample 2. The products from both samples were compounded in accordance with the following recipe:

| | Parts by weight |
|---|---|
| cis-Polybutadiene | 100 |
| Philblack O [1] | 50 |
| Zinc oxide | 3 |
| Stearic acid | 0.5 |
| Flexamine [2] | 1 |
| Aromatic oil | 5 |
| Disproportionated rosin | 5 |
| Sulfur | 1.75 |
| NOBS Special [3] | 0.9 |

[1] High abrasion furnace black.
[2] Physical mixture containing 65 percent of a diarylamine-ketone reaction product and 35 percent of N,N'-diphenyl-p-phenylenediamine.
[3] N-oxydiethylene-2-benzothiazyl sulfenamide.

The stocks were cured 30 minutes at 307° F. and physical properties determined. Results were as follows:

| | Sample 1 (With dispersant) | Sample 2 (No dispersant) |
|---|---|---|
| Tensile, p.s.i | 2,800 | 2,750 |
| Elongation, percent | 540 | 540 |
| 300% Modulus, p.s.i | 1,070 | 1,110 |
| Tensile at 200° F., p.s.i | 1,700 | 1,560 |
| $\Delta$ T, °F | 46.3 | 46.3 |
| Resilience, percent | 74.2 | 72.9 |
| Flex life, thousands of flexures to failure | 2.2 | 1.9 |
| Shore hardness | 58.5 | 58.5 |
| Blowout time, minutes | 60 | 60 |
| Lupke rebound, percent | 78.5 | 78 |

OVEN AGED 24 HOURS AT 212° F.

| | | |
|---|---|---|
| Tensile, p.s.i | 2,440 | 2,470 |
| Elongation, percent | 360 | 360 |
| $\Delta$ T, °F | 36.1 | 34.4 |
| Resilience, percent | 79.1 | 81.2 |

These data show that the presence of the sodium lignin sulfonate had no deleterious effect on the overall properties of the rubber.

As many possible embodiments can be made of this invention without departing from the scope thereof, it is to be understood that all matter herein set forth is to be interpreted as illustrative and not as unduly limiting the invention.

I claim:

1. In the process of recovering a rubbery polymer prepared by polymerizing a monomer mixture containing at least a major portion of a conjugated diene of 4 to 8 carbon atoms from a solution of said polymer in a solvent by steam stripping, the improvement comprising adding to the stripping zone an alkali metal lignin sulfonate.

2. In the process of recovering a polymer selected from the group consisting of cis-polybutadiene, trans-polybutadiene, cis-polyisoprene and trans-polyisoprene from a solution thereof in a solvent by steam stripping, the improvement comprising adding to the stripping zone an alkali metal lignin sulfonate.

3. A process of recovering cis-polybutadiene from a solution thereof in toluene comprising steam stripping toluene from the solution in the presence of water to which has been added an alkali metal lignin sulfonate and recovering the polymer containing the sulfonate dissolved therein.

4. The process of claim 3 wherein said sulfonate is sodium lignin sulfonate.

5. The process of claim 4 wherein the amount of said sulfonate used is in the range of 0.01 to 1 pound per 100 pounds of polymer charged.

References Cited in the file of this patent

UNITED STATES PATENTS

| | | |
|---|---|---|
| 2,769,789 | Madge et al. | Nov. 6, 1956 |
| 2,906,718 | Mills et al. | Sept. 29, 1959 |